(12) United States Patent
Rafel Porti et al.

(10) Patent No.: US 8,600,228 B2
(45) Date of Patent: Dec. 3, 2013

(54) OPTICAL COMMUNICATION

(75) Inventors: Albert Rafel Porti, Ipswich (GB); Alan M Hill, Woodbridge (GB)

(73) Assignee: British Telecommunications PLC, London (GB)

( * ) Notice: Subject to any disclaimer, the term of this patent is extended or adjusted under 35 U.S.C. 154(b) by 400 days.

(21) Appl. No.: 12/863,287

(22) PCT Filed: Jan. 28, 2009

(86) PCT No.: PCT/GB2009/000056
§ 371 (c)(1),
(2), (4) Date: Jul. 16, 2010

(87) PCT Pub. No.: WO2009/095637
PCT Pub. Date: Aug. 6, 2009

(65) Prior Publication Data
US 2011/0013903 A1      Jan. 20, 2011

(30) Foreign Application Priority Data
Jan. 29, 2008 (EP) .................................... 08250339

(51) Int. Cl.
*H04B 10/00* (2013.01)
(52) U.S. Cl.
USPC .............. 398/1; 398/2; 398/5; 398/8; 398/58; 398/66
(58) Field of Classification Search
USPC ................... 398/1–9, 51, 54, 58–72, 79, 83; 359/110
See application file for complete search history.

(56) References Cited

U.S. PATENT DOCUMENTS

| | | | |
|---|---|---|---|
| 2002/0114028 A1* | 8/2002 | Eijk et al. | 359/110 |
| 2004/0202470 A1* | 10/2004 | Lim et al. | 398/51 |
| 2006/0083513 A1* | 4/2006 | Huang et al. | 398/83 |
| 2008/0267628 A1* | 10/2008 | Li et al. | 398/79 |

OTHER PUBLICATIONS

Habel et al: "DE2.6—Resilience aspects in XL-PONs", www.ist-muse.org/Deliverables/WPE2/MUSE_DE2.6_V01.pdf, Sep. 3, 2007, pp. 1-69.*
"Gigabit-Capable Passive Optical Networks (GPON): Transmission Convergence Layer Specification; G.984.3 (02/04)", ITU-T Standard in Force (I), International Telecommunication Union, Geneva, CH, No. G.984.3 (02/04), Feb. 22, 2004, XP017401196.
Frank J. Effenberger Motorola Networks United States of America: "Draft Revised Amendment 1 to G.984.3, Gigabit-capable Passive Optical Networks (G-PON) :, Transmission Convergence Layer Specification (for consent)", ITU-T Draft Study Period 2005-2008, International Telecommunication Union, Geneva, CH, vol. Study Group 15, May 16, 2005, pp. 1-36, XP017407552.

* cited by examiner

*Primary Examiner* — Li Liu
(74) *Attorney, Agent, or Firm* — Nixon & Vanderhye PC

(57) ABSTRACT

A protected passive optical communications system includes terminals, a main head end, and a back up head end allowing communication with the terminals when a fault occurs. The main and back up head ends transmit frames that include header and payload portions to the terminals. The main head end normally transmits control instructions in the header and user data in the payload. The back up head end, in response to a fault, transmits control instructions in the payload, and a control message in the header. The control message indicates control instructions in the payload. If a control message is in the header, each terminal interprets the payload as control instructions for changing operational attribute(s) of a terminal. If a control message is not in the header, each terminal interprets the payload as user data that it forwards to external user(s) external based on an address from the user data.

14 Claims, 5 Drawing Sheets

Schematic diagram of a dual parented PON

Schematic diagram of a dual parented PON

OPTICAL COMMUNICATION

This application is the U.S. national phase of International Application No. PCT/GB2009/000056 filed 28 Jan. 2009, which designated the U.S. and claims priority to European Application No. 08250339.2, filed 29 Jan. 2008, the entire contents of each of which are hereby incorporated by reference.

TECHNICAL FIELD

The disclosed technology is concerned with an optical communications system and, in particular, with a protected optical communication system having a main supply arm and a back up supply arm.

BACKGROUND AND SUMMARY

In a so-called Passive Optical Network or PON, a plurality of terminals are connected to a supply arm by a distribution network having a plurality of splitter junctions arranged in a tree structure. The supply arm is normally formed by a head end arranged along an optical path, and, in some cases, may include a repeater. For fault tolerance purposes, it is known to provide a back up supply arm, also connected to the distribution network. The back up supply arm duplicates the function of the main supply arm, so that if a fault occurs in the main supply arm, the back up supply arm can take over. However, in the event of such a fault, the terminals often move into a non-operational state or other fault state, and the back up supply arm is normally required to perform an initialization routine when it takes over, in order to bring the terminals back into the operational state. This can be excessively time consuming.

According to an aspect of the present invention, there is provided an optical communications system as specified in claim 1. A further aspect of the invention is specified in claim 9.

BRIEF DESCRIPTION OF THE DRAWINGS

Certain exemplary embodiments will now be further described, by way of example only, and with reference to the following drawings in which:

FIG. 1b shows details of an OLT shown in FIG. 1a

FIG. 5 is a block diagram of an ONT of FIG. 1a; and

FIG. 8 is a schematic representation of the embodiment of FIG. 1a; and,

DETAILED DESCRIPTION

Figure 1A:
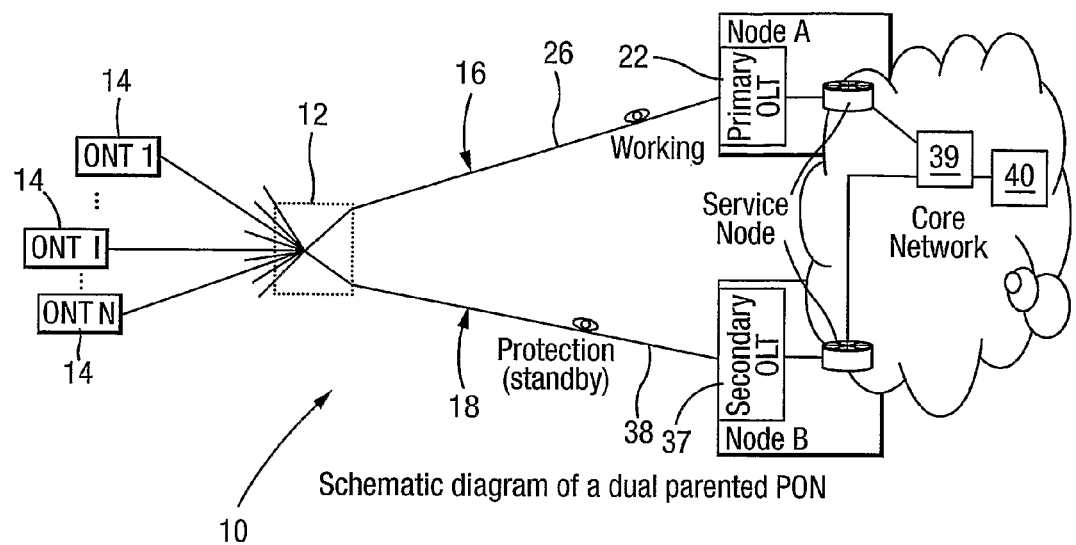
FIG. 1a shows an optical network in accordance with certain exemplary embodiments.

FIG. 1a shows a protected optical communications system 10 having a distribution network 12 for distributing optical signals to a plurality of terminals or optical network terminations, referred to herein as ONTs 14. Signals are supplied to the distribution network by a main (primary) supply arm 16 during normal operation. However, a back up (secondary) supply arm 18 is also connected to the distribution network, such that if a fault occurs in the main supply arm, the back up supply arm can supply the signals to the distribution network instead. The main supply arm 16 has a head end 22, also know as an optical line terminal or OLT for generating optical signals for and receiving signals from the ONTs 14. The OLT is located at a node labelled A. An optical path 26, typically formed from single mode fibre, extends between the OLT and the distribution network. The back up supply arm has the same components as the main supply arm, in particular a backup (secondary) OLT 37 connected to the distribution network by a backup optical path 38. The back up OLT has corresponding components to those of the main OLT for performing corresponding functions.

The distribution network has a plurality of splitter junctions (not shown) arranged in a tree structure for distributing signals from the OLT to the ONTs. In the present example, the distribution network 12 has a first passive optical splitter connected to the main path (and the backup path), which distributes the incoming light from the main path (or the backup path) to a plurality of branch paths, each of which is connected to a respective further splitter. Further levels of split (not shown) will normally be provided, typically allowing 64 or even 1024 ONTs to be connected. Typically, the optical network, preferably the distribution network itself, will have a reach of over 10 km or even over 60 km.

The main OLT and the back up OLT are typically located a different geographical locations, separates for example by over 1 km, so that their respective supply paths can follow diverse routes. The main OLT and the back up OLT are geographically separate, and are each connected at respective nodes A,B to a core telecommunications network for communicating data traffic to and from the optical system. The main and backup OLTs are connected to a common router 39 which is able to selectively route traffic to the back up supply arm and main supply arm. Within the telecommunications network there is provided an Operational Support System or OSS implemented in a central manager unit 40, which is connected through the common router to each of the OLTs so as to control their operation, at least in part on the basis of status data received from the OLTs. The central manager unit is also operatively connected to the common router so as to control which of the two OLTs traffic is directed to.

Figure 1B:
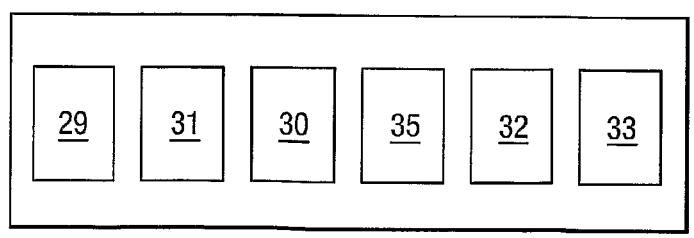

An OLT is shown in more detail in FIG. 1b. The OLT has: an optical stage 29 for transmitting and receiving optical signals to and from the distribution network; a back interface 30 for communicating with network the core; a scheduler stage 31 for controlling the transmissions from the ONTs; a transmission stage 32 for generating the data for downstream transmission to the ONTs; and an Element Manager or EM implemented as a management module 35, for controlling one or more aspects of the OLT operation. A central clock unit 33 is arranged to provide timing signals to the scheduler stage 31.

The management module 35 is arranged to generate status data based on various indicators of the performance of the optical communications system, and to pass this data to the back interface for external transmission through the core network. Examples of indicators may include the signal levels of received optical signals, or the results of local tests carried out automatically by the management module at the OLT. The management module is also arranged to receive external command signals over the back interface, and to perform specified actions in response to these external signals.

The scheduler stage 31 is configured to generate instructions, known as grants, which control the transmissions from the different ONTs. The grants transmitted from the OLT contain an instruction for a given ONT to transmit data for a predetermined time interval at a predetermined time, that is defined with respect to a centralized time (although other in other protocols data transmission is timed with respect to the local arrival time of a control signal).

The clock unit 33 allows the scheduler stage to time the grants such that there is essentially no risk (or a reduced risk) that upstream bursts from one ONT will collide or overlap with a burst from another ONT where optical paths are combined at a splitter. Thus, the scheduler stage schedules the ONT transmissions such that the necessary timing function for temporally interleaving data from different ONTs is carried out remotely from the junction at which the data is temporally interleaved (passively or actively). Multiplexing is thus achieved through the timing of the ONT transmissions, in the way that multiplexing is normally carried out in a Passive Optical Network or PON. The OLT can then access data from each ONT using a TDMA (Time Division Multiplexed Access) protocol.

To take into account the transit times from different ONTs, the OLT, in particular the scheduler stage thereof, is arranged to effect a "ranging" procedure in which the scheduler stage instructs a selected ONT to return a signal after a specified amount of time or immediately after receiving an instruction. The scheduler stage is arranged to calculate the round trip time, that is, the elapsed time between the transmission of the instruction and the arrival of the return signal. The round trip times will normally be different for the different ONTs. Therefore, on the basis of the respective round trip times, the OLT is arranged to calculate a differential delay offset (also known as the equalization delay) for each ONT. The delay offset is calculated such that the sum of the transit time from an ONT and the delay offset for that ONT is the same for each ONT. The scheduler stage is arranged to transmit the respective delay offset to each ONT. Each ONT can then delay their response to grants with the relevant delay offset such that the ONTs respond to the OLT as if they were located at the same distance from it.

Figure 2:
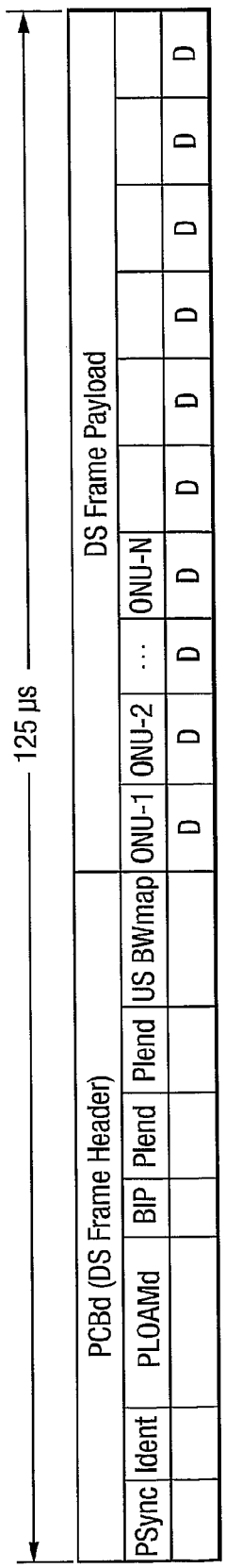
FIG. 2 shows a prior art downstream frame structure.

The transmission stage is configured to assemble data for transmission in the form of frames, each normally of constant duration, and which normally have one or more cyclic characteristic(s). An example of a downstream (DS) frame is shown in FIG. 2 when the OLT is in a regular state, that is, when the ONTs are properly synchronised, and transmitting and receiving data normally (the ONTs will, in this situation, be in an operational state). The frame, which is 125μ in duration, is formed by a header portion, referred to as a PCBd (Program Control Block, downstream), and payload portion, referred to as a DS Frame Payload. The header portion has a plurality of protocol-specific fields for carrying one or more signalling cells. In the present example, there is provided: a PSync field for physical synchronisation; an Ident field for providing a super frame counter; an PLOAMd field for carrying a Physical Layer Operation and Maintenance (PLOAM) cell, which field conveys information used by an OLT for operation purposes; a BIP field for error measurement; and PLend field for, inter alia, cycle redundancy checking; and an Upstream (US) BWmap field, which includes the grants for allocating upstream bandwidth to the ONTs. The PLend field also includes information on the number of grants in the BWmap field.

Figure 3:
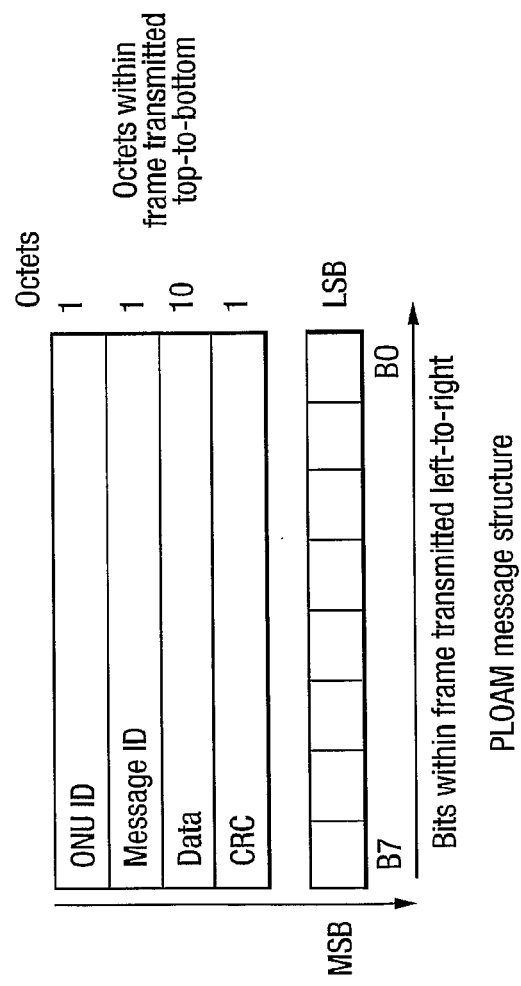
FIG. 3 shows a downstream PLOAM cell.

A PLOAM cell is shown in FIG. 3. The cell itself has a plurality of fields, that is, information located at pre-determined time-positions which in this examples are relative to a synchronisation signal in the PSync field. In particular, there is provided in the first octet a field for an ONT identifier (ONT ID) or for a broadcast identifier indicating that the cell is intended for all the ONTs. In the second octet there is a message ID field which indicates the type of message being sent. A data field is provided in the following ten octets, for data related to the particular type of message indicated by the message ID. Generally, a message ID designates a pre-determined control instruction for controlling an ONT. For example, a message ID equal to "5" refers to an instruction for an ONT to de-activate itself and cease to send upstream traffic. The data field is followed by a field for cycle redundancy check. Thus, a PLOAMd cell represents a transmission unit with a predetermined information structure.

Figure 4:
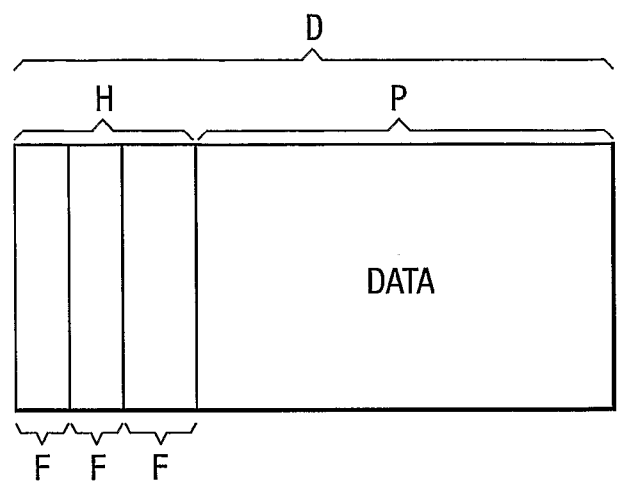
FIG. 4 shows prior art downstream data cell.

The payload portion of the frame is composed of a series of successive data cells D, each of which is addressed to a given ONT. An example of a data cell is shown in FIG. 4. The cell has a cell header portion H containing one or more protocol-specific fields F, and payload portion P containing customer data. One of the fields F is a Port Number field, indicative of the port number to which the ONU is to output the data in the payload.

Figure 5:
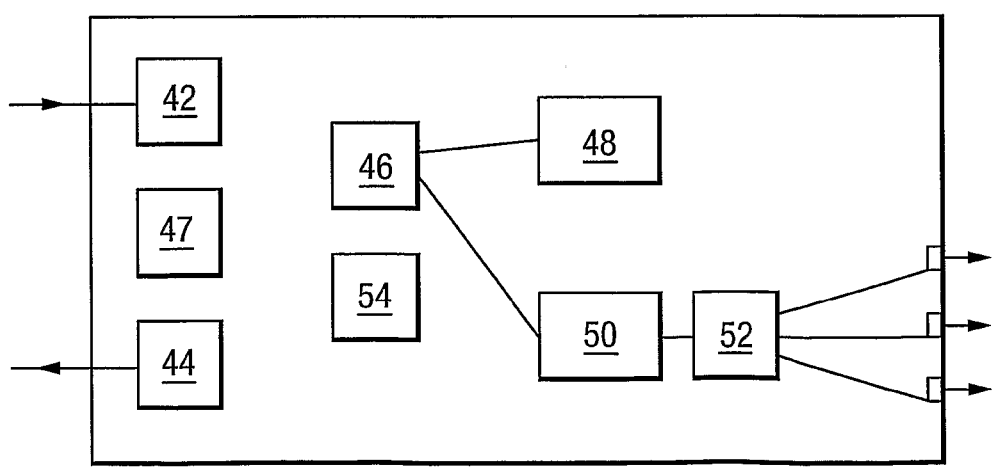

The ONTs are each arranged to transmit short bursts of data in response to scheduling instructions or "grants" from the OLT, and to generally refrain from transmitting data in the absence of grants. An ONT is shown in more detail in FIG. 5. The ONT has an optical receiver 42 for converting downstream optical signals from the optical distribution network into the electrical domain, and an optical source 44 for transmitting signals in an upstream direction towards the OLT. The optical receiver 42 is connected to a reader unit 46, which is arranged to monitor the upstream traffic, and to either (i) ignore the data if it not addressed to that ONT, (ii) if data is addressed to that ONT (either specifically or through a broadcast address) to capture the data for local processing at that ONT.

The reader unit is connected to a plurality of separately addressable buffers, here a housekeeping buffer 48 for data relevant to the operation of the ONT, and a service is a buffer 50 for user data. A distributor module 52 is provided for passing the data from the service buffer to a rear interface. Data from the distributor module is mapped to one of a plurality of ports, that is channels, which channels are mapped to respective physical outputs in the rear interface in dependence on the port number found in the header portion of a data cell. The outputs are each connectable to a respective external user device (not shown), examples of which include a personal computer and telephony apparatus.

A local controller 54 is operatively connected to the housekeeping buffer for receiving data from a frame header, in particular the control instructions in a PLOAM cell identified on the basis of the message ID therein. In order to correctly interpret the message ID, the local controller has access to a local memory 47 containing an instruction table with each pre-agreed control instruction stored in association with its message ID. The message IDs and their associated control instructions will be stored in an ONT at the manufacturing stage.

In particular, the local store has, in association with a given ID, an instruction termed "POPUP" message for causing the local controller to bring an ONT into either an operational state (in which an ONT can transmit and receive data normally) or into a ranging state (in which an ONT refrains from transmitting normal use data), depending on whether the PLOAM cell carrying the POP-UP message is addressed to a particular ONT or whether it is broadcast: that is, whether the ONT ID field has an individual address or a broadcast address. Thus, if a POP-UP message with a broadcast address is received, the receiving ONTs will each move into a ranging state in accordance with the pre-agreed instruction table stored in the local memory. However, if an ONT receives a POP-UP message in a PLOAM cell that is specifically addressed to that ONT, that ONT will be caused to go into the operational state.

A local clock unit is provided at the ONT. The local clock unit is arranged to achieve synchronization with the downstream signals both at the bit level and at the frame level. The clock unit can be viewed as providing a plurality of counters, one counter being incremented each frame, and another counter being incremented each byte and being reset at each given frame.

The reader unit has access to format information stored in the local memory at the manufacturing stage. The format information includes details of the frame structure shown in FIG. 2, in particular information on the delineation of the different fields and portions of the frame. In particular, the reader unit has access to details of the structure of a PLOAM cell.

The reader unit is coupled to the local clock unit so as to receive timing signals therefrom. Using these timing signals, and on the basis of the stored format information, the reader unit is arranged to extract the information from each field in an arriving frame, and to pass the information to the housekeeping buffer and surface buffer as appropriate. In more detail, the reader unit is arranged to match the stored frame structure with the arriving data bits, and to process the information at a different time positions in the frame in accordance with the one of a plurality of sets of rules stored in the local memory. The rules govern how information at different time positions in a frame is processed.

A set of rules is associated with each type of possible cell within a frame. Thus, a set of rules referred to as data-cell rules governs how data in a data cell is manipulated, and a different set of rules, referred to as signalling-cell rules governs how data in a PLOAM signalling cell is manipulated. Because the information contained in the different cell types is differently structured, the correct information is needed in order to correctly extract the information in a given cell.

Thus, based on format information relevant to the frame structure of FIG. 2, the reader unit is arranged to invoke the signalling-cell rules at the time segment corresponding to the PLOAMd field in the frame header, and to invite the data cell rules for each time segment corresponding to the cells labelled "D" in the frame payload.

The data-cell rules cause the reader unit to forward data in the payload portion of a data cell to the service buffer, for transmission to an output so that data can be received by an external user. In contrast, the signalling-cell rules cause information in a PLOAM cell to be passed to the housekeeping buffer in order to be used internally by the ONT.

Normally, that is, in the absence of a fault which cannot be sufficiently quickly rectified (e.g. by ranging), the back up supply arm is idle and the main supply arm carries traffic to and from the distribution network. However, in response to status data being received indicative of a fault in the main supply arm, the central manager unit 40 is arranged, in a handover procedure, to close down the main supply arm, activate the back up supply arm, and, once activated, direct traffic thereto.

One consequence of a fault which requires that the handover procedure to be invoked is that the ONTs move into an error state, or other non-operational state in which the ONTs are unable to transmit user data normally. It is therefore necessary for the backup OLT to bring the ONTs back into the operational state. However, a broadcast POP-UP message from the backup OLT will cause the ONTs to go into the ranging state, which is not always necessary. Furthermore, the header portion of a regular downstream frame cannot accommodate an individually addressed POPUP message for each ONT.

Figure 6:
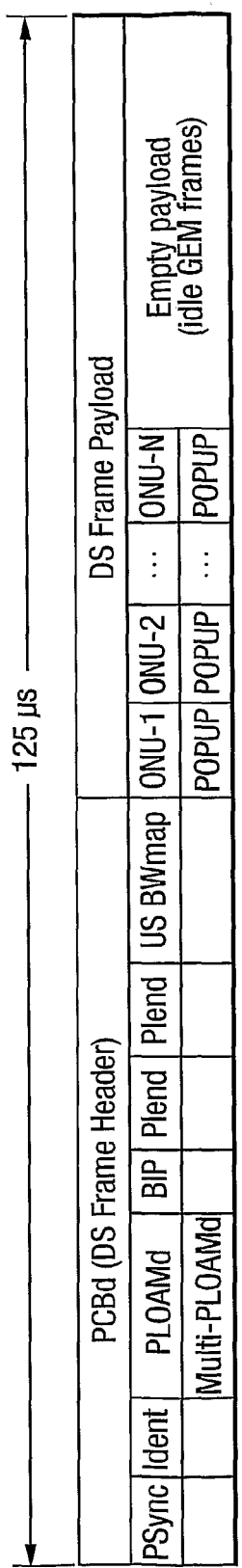
FIG. 6 shows a downstream frame structure in accordance with the present invention.

Accordingly, the OLT is arranged to transmit a plurality of PLOAM cells in the payload portion of a frame as shown in FIG. 6. Each PLOAM cell contains an individually addressed POP-UP message, one PLOAM cell being provided for each ONT in the cell payload.

In order to allow an ONT to correctly process the PLOAM cell addressed to it in the frame payload, control instructions are provided in the PLOAMd field of the frame header. The control instructions are contained in a message referred to herein as a multi-PLOAM message (which message will preferably have a message ID associated therewith). The multi-PLOAM message has the same format as an ordinary PLOAM cell, so that the signalling cell rules stored in an ONT can be invoked in order to read the message, and extract the control instructions therefrom.

The control instructions cause the reader unit of an ONT to invoke signalling-cell rules with regard to the payload portion of the frame containing the multi-PLOAM message, rather than invoking the data-cell rules which the reader unit would otherwise by default invoke in the frame payload. As, a result of the multi-PLOAM message, a plurality of individually addressed POP-UP messages can be contained in the payload of a single frame, each in a respective PLOAM cell addressed to a respective ONT. Thus, in the event of a fault in the main supply arm, the ONTs can be brought back into the operational state with a smaller number of frame transmissions than would be required if only a single POP-UP message was transmitted in each frame.

Because the above embodiment reduces the need to transmit only a single POP-UP message per frame, faster re-activation both the ONTs in the event of a fault can be achieved. Although the multi-PLOAM message is particularly useful in a protected PON network having a plurality of supply arms, the multi-PLOAM message may also be of use in a simple PON in order to achieve fast re-activation off to a fault.

The following additional comments are provided.

GPON is an ITU-T standardised fibre access network based on a Passive Optical Network. A PON (passive optical network) connects a head-end (OLT) with a number of remote stations (ONUs or ONTs) via an optical distribution network (ODN) consisting of a fibre feeder between the OLT and a power splitter from which an individual fibre connects to each ONU. Recommendation ITU-T G.984.3 specifies the control protocols, i.e. TC Layer for the GPON. It uses a frame format for both downstream, i.e. for transmissions from the OLT to the ONUs and upstream, i.e. from all ONUs to the OLT. The frame format structure is specified with a fixed duration of 125 μs, and where in the downstream there is one Physical Layer OAM (PLOAM) message only, called PLOAMd—see FIG. 3. In the upstream direction there is one PLOAM message for each ONU transmission called PLOAMu. FIG. 2 shows the structure of the GPON downstream frame. GPON bit rate in the downstream is 2,488.52 Mbit/s, which makes for 38,880 bytes in each frame. PLOAMd messages are 13 bytes long.

The OLT transmit traffic downstream in a continuous mode and is broadcast to all ONTs. Each ONT detects the traffic addressed to it, which then passes on to the relevant user interface, discarding the rest. In the upstream direction, each ONT transmits a burst of information toward the OLT. These bursts are multiplexed into the same fibre by the power splitter. The OLT controls the allocation of these bursts in order to avoid collisions after the splitting point. Each ONT is in general connected at a different fibre distance from the OLT.

In order to enable the control of the burst transmission position, the OLT need to range each individual ONU. During ONU activation, the OLT ranges the ONU, which is done by measuring the Round Trip Delay (RTD) to each ONU and calculating the necessary buffer delay each ONU has to apply to its transmissions such that all ONUs are synchronised and collisions are normally prevented. This buffer delay is known as Equalisation Delay for ONU(i) (EqD(i)). This EqD(i) is conveyed to ONU(i) via a PLOAMd message ("Ranging_Time" message). After each ONU applies its EqD(n), the total delay between the OLT sending the downstream frame and the reception at the OLT of the start of the upstream frame, is the Equalised Round Trip Delay.

Dual Parenting protection is a type of protection where the ONUs/ONTs are connected to two geographically different OLTs. In normal operation only the Primary OLT is active being in control of the whole PON and the Secondary OLT is not allowed to transmit.

When there is a failure requiring activating the protection switching the secondary OLT should take over control of the ONTs in the PON. This switch over time should take place in a short time.

In one implementation, a number of PLOAMd messages may be sent to each ONT three times. More than one type of PLOAMd messages has to be sent to re-activate the ONTs onto the secondary OLT, but let's say for illustration purposes that it requires only one type of PLOAMd messages to be sent to each ONT three times to bring it back into operation on the secondary OLT. If the PON has 64 ONTs connected, and because there is normally room for only one PLOAMd message in each PON frame, i.e. every 125 µs, it will take 64×125 µs×3=24 ms to send all messages. This time is not very long, but it is expected that the Extended-GPON, will support 128 ONTs, which increases this time to 48 ms. The problem will be exacerbated for Long Reach PON where it is expected that the number of supported ONTs will be 512, thus taking 192 ms, or even 1024 ONTs, pushing this time up to 384 ms.

Sending PLOAMd messages to each ONT is only one phase in the protection switching problem. In order to bring the protection switch-over time down below 50 ms, it is important to minimise every single step of the process of the protection switching.

This embodiment brings about a method of improving one necessary step in the process of dual parenting protection switching. This involves defining a new PLOAMd message, which will indicate the ONTs that there are further PLOAMd messages within the payload of that downstream frame, preferably at the start of the payload. In fact, the rest of the payload will be empty as the ONTs are in the process of being re-activated with the secondary OLT. If we have a PON with 128 ONTs, we only need 128×13 bytes=1664 bytes out of the 38,880 bytes in total in the frame minus those occupied by the frame header.

Even in the case of Long Reach PON with 1024 ONTs where the length of the PLOAMd messages has to be increased to 14 bytes to make room to ONU-ID (2 bytes instead of 1 byte needed in GPON and E-GPON), these would take 1024×14 bytes=14,336 bytes.

The OLT has to send the PLOAMd message to each ONT 3 times, i.e. will need 3 PON frames. Therefore, the time needed to send all 3 PLOAMd messages to all ONTs is 3×125 µs=325 µs independently of the number of ONTs, which represents a huge improvement (2 orders of magnitude) with respect the normal procedure.

G.984.3 (February 2004) specifies the format of the control messages and defines 19 messages in the downstream direction. Note that the structure of these messages may be different (e.g. different length of ONU-ID field), but the fundamental idea remains the same.

G.984.3 Amendment 1 (July 2005) defines a new PLOAM downstream message, making a total of 20 PLOAMd messages.

This invention requires the definition of an additional PLOAMd message, which we could call say "PLOAMd payload" or "Multi PLOAMd" message.

Message Definition
Message ID: 21
Message Name: "PLOAMd payload" (example)
Function: to indicate to the ONUs that the PON downstream frame contains additional PLOAMd messages located in the frame payload, i.e. after the header PCBd
Trigger: When the OLT needs to send one PLOAMd message to each ONU in the PON
Times sent: 3
Effect of Receipt: ONU looks for additional PLOAMd messages in the PON frame payload
Message Format

| PLOAMd payload message | | |
|---|---|---|
| Octet | Content | Description |
| 1 | 11111111 | Broadcast message to all ONUs (Note 1) |
| 2 | 00010101 | Message identification "PLOAMd payload" |
| 3-12 | Unspecified | |

(Note 1):
The length of this field should be the appropriate (maybe increased for the Next Generation Access network such as the Long Reach PON)

Figure 8:
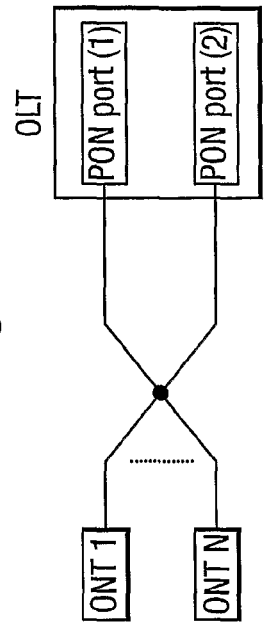
Figure 7:
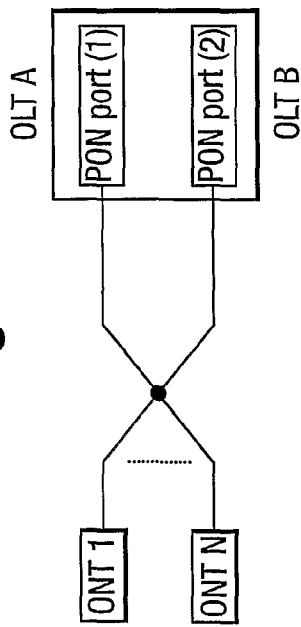
FIG. 7 shows a further embodiment of an optical network.
Figure 9:
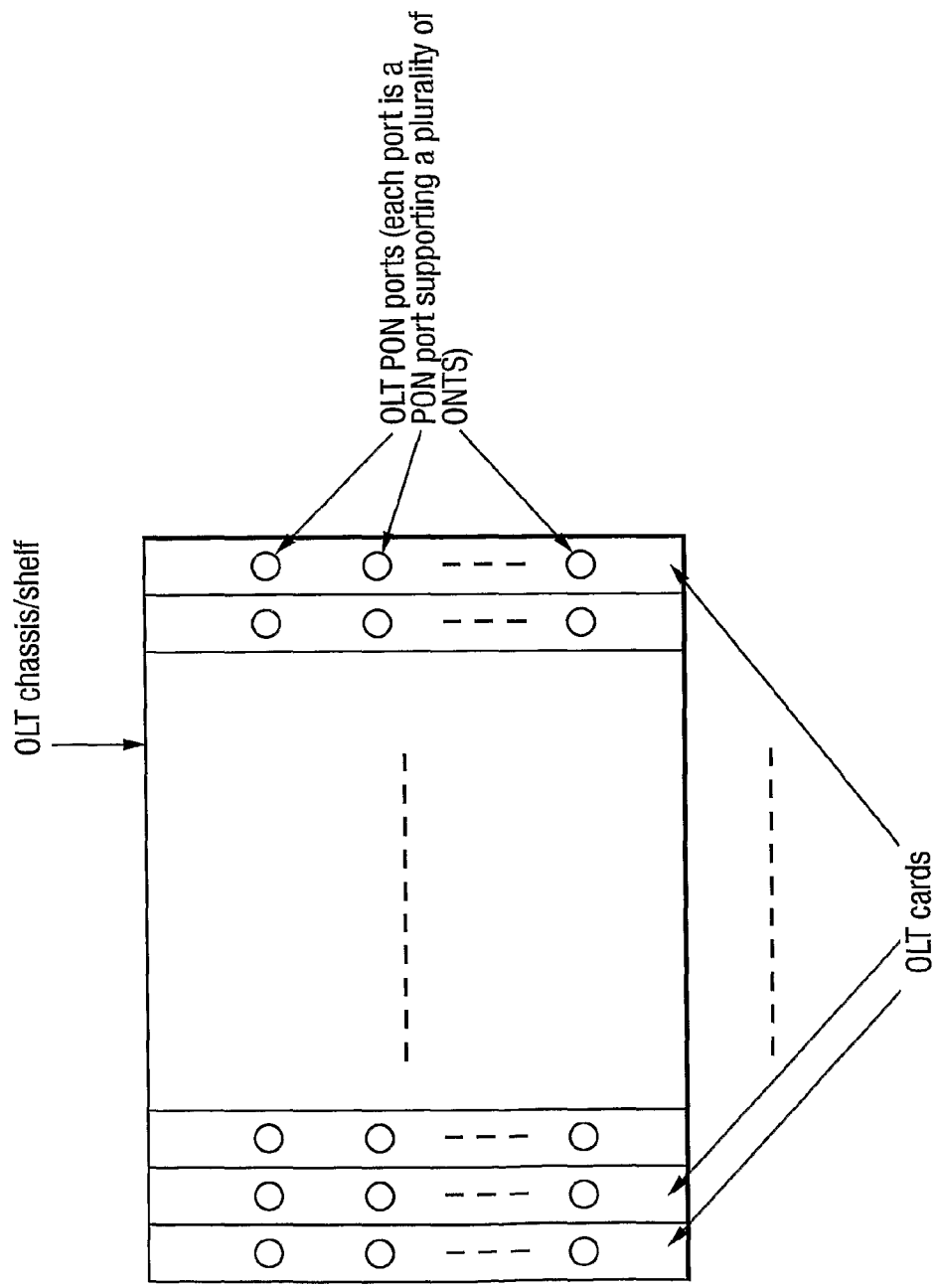
FIG. 9 shows in more detail and OLT chassis for use in the embodiment of FIG. 7.

The main and backup OLTs need not be located at different nodes as shown in FIGS. 1a and 7, but may instead be located at the same geographical location, in particular act the same node, in a configuration known as a Type B configuration. This is shown in FIG. 8. In particular, the main OLT and the back up OLT may be implemented as which are mounted on a common frame, chassis or other support structure as indicated in FIG. 9.

The invention claimed is:

1. An optical communications system comprising:
a plurality of terminals,
a main head end for communicating with the terminals in an operational state, and
a back up head end arranged to allow communication with the terminals in the event of a fault,
the main head end and the back up head end each being operable to transmit a sequence of frames for communicating with the terminals, each frame having a header portion and a payload portion,
the main head end being arranged, in normal operation, to transmit control instructions in the header portion and user data in the payload portion of each frame,
the back up head end being arranged, in response to a fault, to transmit control instructions in the payload portion of a frame, and a control message in the header portion of that frame, which control message is indicative of the presence of control instructions in the payload portion,
the terminals being responsive to the control message, such that:
in the presence of a control message in the header of a frame, each terminal interprets the payload of that frame as containing control instructions for changing one or more operational attributes of a terminal; and, in the absence of a control message in the header portion of a frame, each terminal is arranged to interpret the payload of that frame as containing user data and to forward the user data to one or more users external to the terminal, in dependence on an address associated with the user data.

2. An optical communications system as claimed in claim 1, wherein a respective control instruction is provided for each terminal.

3. An optical communications system as claimed in claim 1, wherein control instructions addressed to different terminals are provided in the payload portion of a common frame.

4. An optical communications system as claimed in claim 1, wherein each terminal is arranged to: move into an operational state in response to a control instruction if the control instruction is individually addressed to that terminal; and, move into a ranging state if the control instruction has a broadcast address.

5. An optical communications system as claimed in claim 1, wherein the optical communications system is a passive optical network.

6. An optical communications system as claimed in claim 5, wherein the passive optical network has a reach of at least 20 km.

7. An optical communications system as claimed in claim 5, wherein is the passive optical network has more than 1000 terminals.

8. An optical communications system as claimed in claim 1, wherein the or each control instruction is a physical layer instruction.

9. A method of operating a head end unit in an optical network, the optical network comprising a normal operational state in which the head end unit broadcasts a sequence of normal frames to a plurality of terminals, each frame having a header portion and a payload portion, user data being provided in the payload portion, the method comprising:
in the event of a fault in the optical network, transmitting at least one modified frame having control instructions in place of user data in the payload portion of the frame, which control instructions cause the terminals to change from a first state to a second state, with the presence of the control instructions in the payload portion of the frame being indicated by a control message included in the header portion of that frame,
wherein the terminals are responsive to the control message, such that:
in the presence of a control message in the header of a frame, each terminal is arranged to interpret the payload of that frame as containing control instructions for changing one or more operational attributes of a terminal; and,
in the absence of a control message in the header portion of a frame, each terminal is arranged to interpret the payload of that frame as containing user data and to forward the user data to one or more users external to the terminal, in dependence on an address associated with the user data.

10. A method as claimed in claim 9, wherein the first state is a fault state, and the second state is an operational state.

11. A method as claimed in claim 9, wherein an individually addressed control instruction is transmitted to each terminal respectively, the individually addressed control instructions being transmitted in a common frame.

12. A method as claimed in claim 9, wherein in the normal operational state, normal frames are broadcast to the terminals by a first head end unit, and wherein a second head end unit is used to transmit the or each modified frame in the event of a fault.

13. A method as claimed in claim 12, wherein the first and second head end units are geographically separate.

14. A method as claimed in claim 12, wherein the first and second head end units are located at the same geographical location.

* * * * *